United States Patent [19]

Kurihara et al.

[11] Patent Number: 5,144,560
[45] Date of Patent: Sep. 1, 1992

[54] CONTROL METHOD FOR AN INTERNAL COMBUSTION ENGINE AND APPARATUS THEREFOR

[75] Inventors: Nobuo Kurihara, Hitachiohta; Masayoshi Kaneyasu, Hitachi; Junichi Ishii, Katsuta, all of Japan

[73] Assignee: Hitachi, Ltd., Tokyo, Japan

[21] Appl. No.: 492,596

[22] Filed: Mar. 12, 1990

[30] Foreign Application Priority Data

Mar. 10, 1989 [JP] Japan .................. 1-056487

[51] Int. Cl.⁵ .................. F02P 5/00; F02P 5/15
[52] U.S. Cl. .................. 364/431.04; 364/431.01; 364/431.07; 364/431.05; 123/416; 123/419; 324/392
[58] Field of Search .................. 364/431.04, 431.01, 364/431.03, 431.05, 717, 572, 574, 484; 123/417–419, 428, 480, 416; 324/391, 392, 77 R

[56] References Cited

U.S. PATENT DOCUMENTS

| | | | |
|---|---|---|---|
| 4,236,214 | 11/1980 | Sasayama | 364/431.04 X |
| 4,262,334 | 4/1981 | Monpetit | 364/431.04 |
| 4,375,668 | 3/1983 | Leung et al. | 364/431.04 X |
| 4,379,333 | 4/1983 | Ninomiya et al. | 364/431.04 X |
| 4,407,251 | 10/1983 | Nakanishi | 123/478 X |
| 4,800,499 | 1/1989 | Ina et al. | 364/431.03 |

Primary Examiner—Parshotam S. Lall
Assistant Examiner—E. J. Pipala
Attorney, Agent, or Firm—Ladas & Parry

[57] ABSTRACT

An engine control apparatus for shifting an ignition timing signal to an ignition coil (48) so that the engine produces optimum torque generates a pseudo random signal (26) which is preferably an M series signal and applies the pseudo random signal to a parameter of the engine having a noise frequency component such as the engine rotational speed y(t). The M series signal is a signal having a impulse type self correlation function. A mutual correlation function of the number of revolutions of the internal combustion engine and of the M series signal is computed (30–44) and an optimum ignition advance angle is supplied to an adder (46). The adder (46) combines the optimized signal ignition advance angle with a basic ignition timing signal ($\theta_{advB}$) to provide an ignition timing signal ($\theta ig$) to the ignition coil (48).

20 Claims, 11 Drawing Sheets

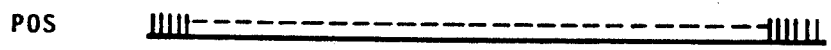
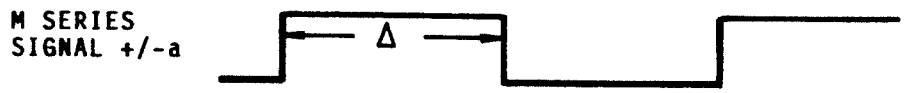
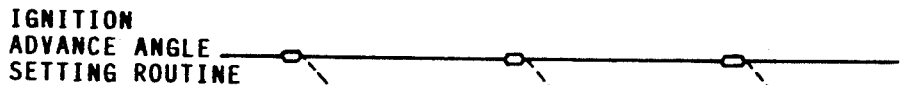
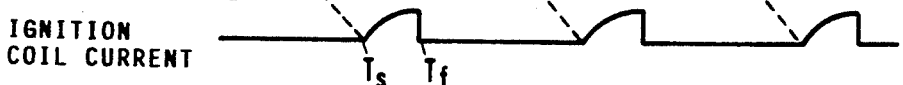
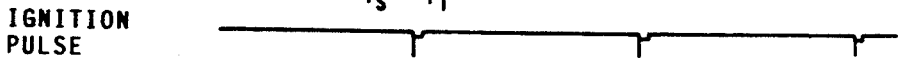
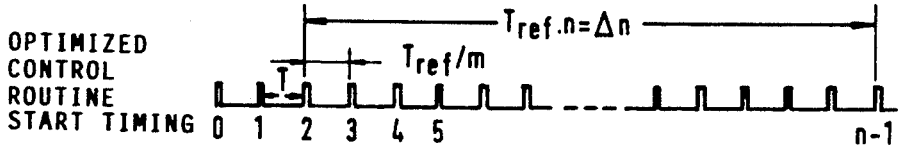
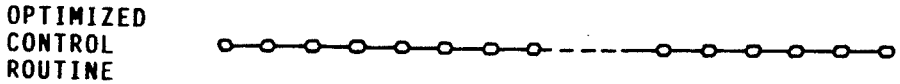
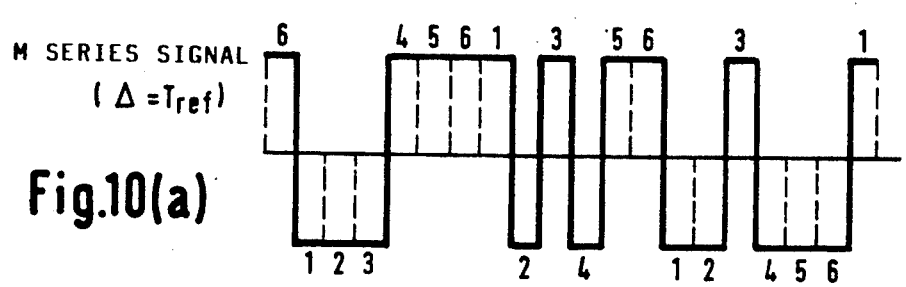
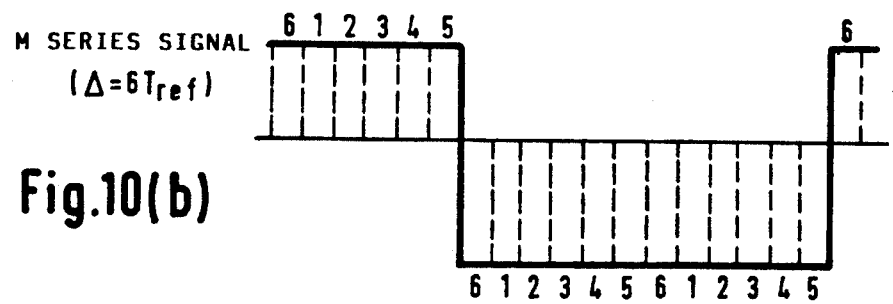

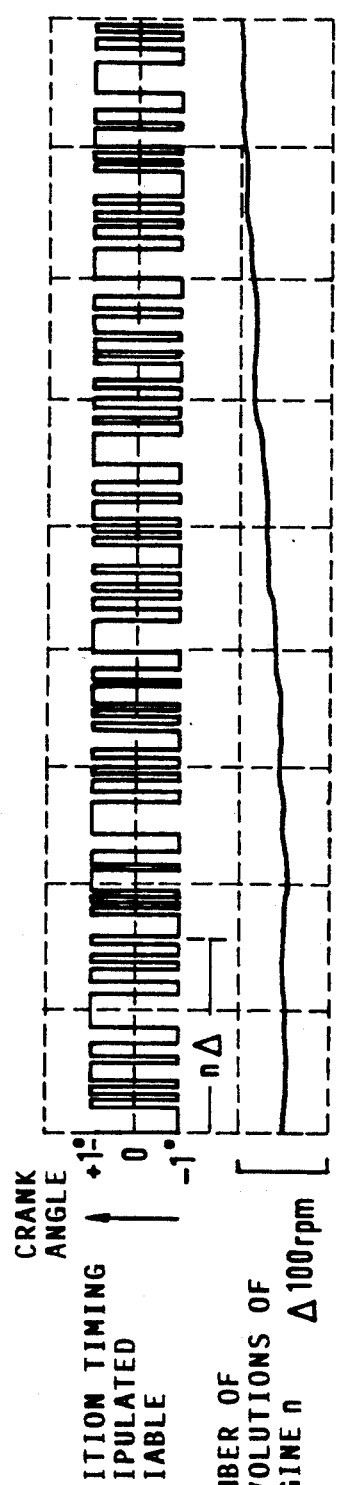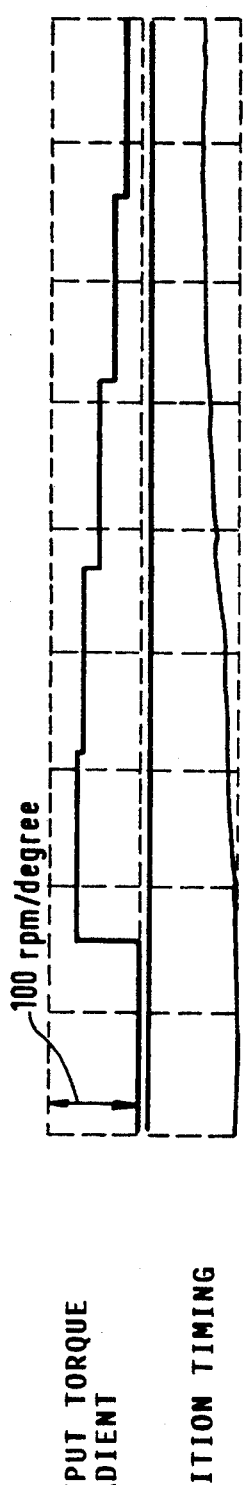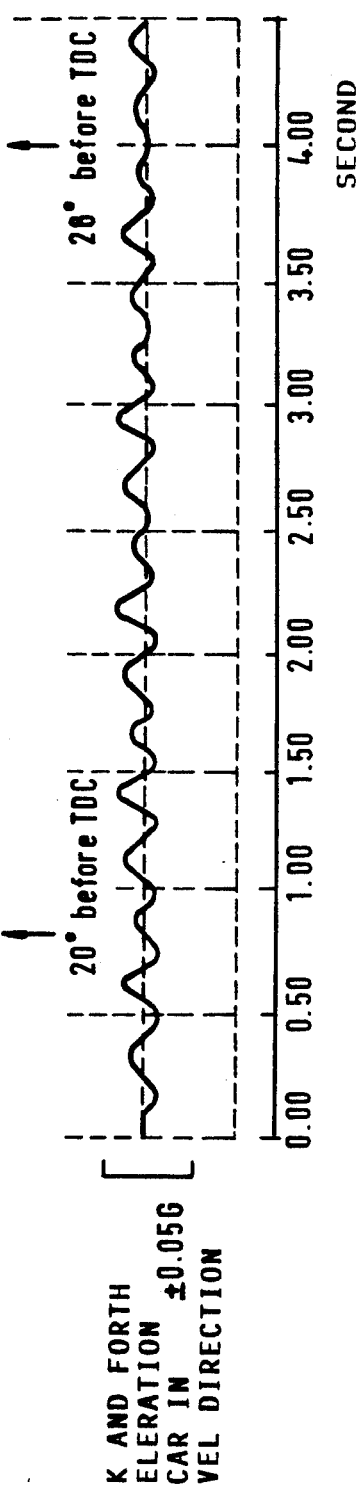

Fig.16(a) M SERIES SIGNAL (degree) ±2° 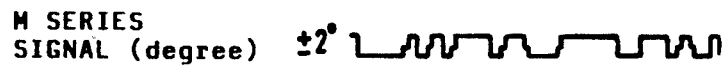
Fig.16(b) ROTATIONAL SPEED (rpm) ±30 
Fig.16(c) TORQUE GRADIENT (rpm/degree)
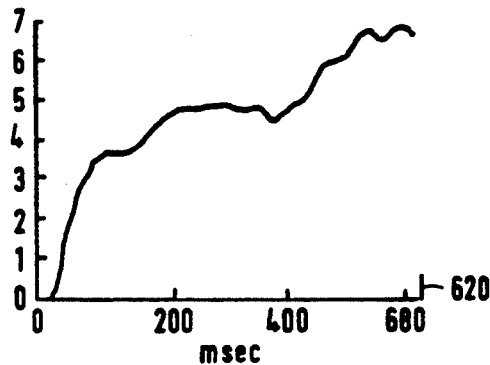
Fig.17(a) IGNITION ADVANCE ANGLE (degree)
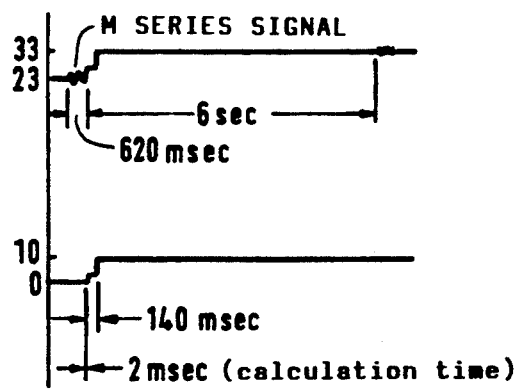
Fig.17(b) OPTIMIZED IGNITION TIMING SIGNAL (degree)
Fig.17(c) ROTATIONAL SPEED (rpm)
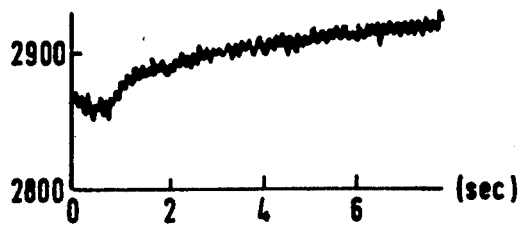

CONTROL METHOD FOR AN INTERNAL COMBUSTION ENGINE AND APPARATUS THEREFOR

BACKGROUND OF THE INVENTION

This invention relates to a control method for an internal combustion engine and to an apparatus for performing said method. The invention has particular suitability for controlling and maintaining an internal combustion engine ignition timing at an optimum position to obtain improved fuel consumption.

DESCRIPTION OF RELATED ART

Under the same operating conditions such as amount of fuel, number of engine revolutions, load, fuel properties, etc., an internal combustion engine changes its generating torque when the ignition timing is adjusted, and generates the maximum torque at an optimum ignition timing. Accordingly, it is clear that the fuel consumption rate of the internal combustion engine will be improved if the ignition timing is continously varied so as to yield the maximum torque under different operating conditions.

A present date technique is to hold ignition timing information in a read only memory (ROM) and it has been proposed to control the ignition timing of an internal combustion engine in accordance with the map data, the map data being prepared to indicate the ignition timing providing maximum output in response to the number of engine revolutions and load on the internal combustion engine. However, the optimum ignition timing fluctuates with behavior of individual engines and due to ageing caused by carbon deposits, sensor drift, actuator drift, and in the use of fuels having different octane numbers. It has therefore been extremely difficult to control the engine in proper response to such fluctuating conditions.

An attempt at overcoming such difficulties is disclosed in an article published in the SAE PAPER (SAE) 870083 (February 1982) pp. 43–50 which discloses a method for predicting ignition timing giving the maximum torque output from the detected rate of change of rotation of an internal combustion engine when the rotational speed is changed slightly by increasing or decreasing the ignition timing while the internal combustion engine is running. This method moved the ignition timing advance angle in proportion to the gradient of the output torque of the internal combustion engine, i.e. in accordance with the characteristic of output torque against ignition advance angle.

Thus, denoting the output torque of an internal combustion engine by T, denoting the number of engine revolutions by N, and denoting the ignition advance angle by $\theta$, then the following formula applies:

$$\frac{\Delta T}{\Delta \theta} = \frac{\Delta T}{\Delta N} \cdot \frac{\Delta N}{\Delta \theta} \approx K \frac{\Delta N}{\Delta \theta}$$

An optimum control is therefore achieved by applying the method termed the "hill climbing" method in the said article; that is to say instead of determining the change gradient of output torque to ignition advance angle ($\Delta T/\Delta \theta$), a change gradient of the number of revolutions of the internal combustion engine to ignition advance angle ($\Delta N/\Delta \theta$) is determined, and the amount of the ignition advance angle is moved in proportion to the gradient of the characteristic $\Delta N/\Delta \theta$.

To detect the optimum ignition timing with this method, it is necessary to determine the gradient of the number of engine revolutions to the ignition timing as described above and the optimum ignition timing is normally taken to be when the gradient change of the characteristic is zero. However in the known prior art device, due to the low signal/noise ratio in the engine revolutions sensor, a sufficient determination cannot be obtained unless a considerable change is given to the number of revolutions of the internal combustion engine, which results in the vehicle jerking and reducing driving comfort.

It is an object of this invention to provide a method and apparatus which detects an optimum ignition internal combustion engine timing without upsetting the normal operation of the internal combustion engine.

SUMMARY OF THE INVENTION

According to one aspect of this invention there is provided an engine control apparatus including means for generating a psuedo-random signal, means for applying said pseudo random signal to means defining an engine variable having a noise frequency component, means for detecting the combined pseudo random signal and engine variable having said noise frequency component, means for correlating the pseudo-random signal with said combined signal to filter out the noise frequency component, means for integrating the combined signal and means for using the result of said integration for a control function.

Preferably said means for generating a pseudo random signal is a means for generating an M series signal having an impulse type self correlation function, and said means defining an engine variable is a sensor for detecting the number of revolutions of an internal combustion engine.

Conveniently a basic ignition advance angle is derived from memory means comprising a map of engine load against engine revolutions and adder means are provided for combining said basic ignition advance angle with the output of said means for integrating whereby the ignition timing angle is adjusted to an optimum value.

In a currently preferred embodiment there is provided an air quantity sensor for measuring air quantity $Q_a$ supplied to the internal combustion engine, an injector for supplying fuel to said engine, micro computer means for controlling said injector and said ignition coil said micro computer being arranged to generate a fuel injection period signal $T_i$ in dependence upon a load on the engine ($L = Q_a/N$) determined by the ratio of outputs of the air quantity sensor and the engine revolution sensor.

According to another aspect of this invention there is provided a method of controlling an internal combustion engine including the steps of generating a pseudo random signal, applying said pseudo-random signal to an engine variable having a noise frequency component, detecting the combined pseudo random signal and said engine variable having said noise frequency component, correlating the pseudo-random signal with said combined signal to filter out the noise component, integrating the combined result and using the result of said integration for a control function.

Preferably the pseudo-random signal is a search signal having an impulse type self correlation function and advantageously the control function is an ignition timing control for an internal combustion engine and the result of said integration is combined with a basic engine ignition advance angle to provide an optimum ignition timing signal.

Conveniently said pseudo-random signal has an impulse type self correlation function and is overlapped onto an ignition timing signal, a correlation signal is read out which is a function obtained by integration by parts of said pseudo-random signal stored in a memory in synchronism with said pseudo-random signal, determining an output torque gradient relative to ignition timing caused by the pseudo-random signal from said mutual correlation signal and the number of revolutions of the internal combustion engine detected by a revolution sensor, generating a correction signal obtained by integration of said output torque gradient and correcting said ignition timing by the correction signal to produce an up/down manipulation of said ignition timing signal to thereby vary the number of revolutions of the engine.

Advantageously said pseudo-random signal is an M series signal having binary values.

In a feature of this invention there is provided an ignition timing control method for an internal combustion engine having a micro computer for performing computations in response to number of revolutions and load on the internal combustion engine, and for producing ignition timing adjustments, the ignition timing control method changing the number of revolutions of the engine a small amount through up/down manipulation of said ignition timing by overlapping a search signal having an impulse-type self correlation function on said ignition timing signal, computing a mutual correlation function of the number of revolutions of the internal combustion engine and of said search signal, and correcting said ignition timing by generating a correction signal using said mutual correlation function.

In a further feature of this invention there is provided an ignition timing control method for an internal combustion engine having a micro computer adapted to perform computations in response to number of revolutions and load on the internal combustion engine and to adjust the ignition timing of said engine with an ignition timing signal generated on the basis of the computed results, said method including the steps of changing the number of revolutions of the engine by a small amount through up/down manipulation of said ignition timing by overlapping a search signal having an impulse-type self correlation function on said ignition timing signal, reading out a correlation signal which is a function obtained by integration by parts of said search signal stored in a memory of said micro computer in synchronism with said search signal, determining an output torque gradient at a unit change of the ignition timing caused by the search signal from said mutual correlation signal and the number of revolutions of the engine, generating a correction signal obtained by integration of said output torque gradient and correcting said ignition timing by the correction signal.

In another feature of this invention there is provided an ignition timing control method for an internal combustion engine having a micro computer which performs computations in response to the number of revolutions and the load on the internal combustion engine and makes ignition timing adjustments with an ignition timing signal generated on the basis of said computed results, said ignition timing control method including the steps of changing a number of revolutions of the internal combustion engine through up/down manipulation of said ignition timing by overlapping a search signal having a) a magnitude of binary values;

b) a minimum pulse width defined by the number of combustion strokes of said engine;

c) an impulse-type self correlation function, on said ignition timing signal, and correcting said ignition timing depending on the gradient of the detected number of engine revolutions versus ignition timing.

In a broad aspect of this invention there is provided a method of correcting an internal combustion engine parameter which is susceptible to electrical noise including the steps of combining said parameter with a search signal having an impulse-type self correlation function, digitally filtering the combined signal to provide a correcting signal and modifying a condition of said engine with said correcting signal.

It will therefore be understood that the present invention changes the ignition timing of an internal combustion engine in accordance with a search signal which may be a signal known as an "M series signal" having an impulse-type self correlation function and to control the ignition timing on the basis of the rate of change of the number of revolutions of the engine at that time.

BRIEF DESCRIPTION OF THE DRAWINGS

The invention will now be described by way of example with reference to the accompanying drawings in which:

FIGS. 9(a)-9(h) show control timing diagrams for the program used in the invention, FIGS. 10(a) and 10(b) are explanatory wave forms of the M series signal distribution used in the invention, FIGS. 16(a)-16(c) shows the result of overlapping an M series signal onto an ignition timing signal with relation to the engine rotational speed and torque gradient, and FIGS. 17(a)-(c) show test results actually overlapping the M series signal on an ignition control showing the optimised ignition timing signal and change in engine rotational speed.

In the figures like reference numerals denote like parts.

DESCRIPTION OF THE PREFERRED EMBODIMENTS

Figure 1A:
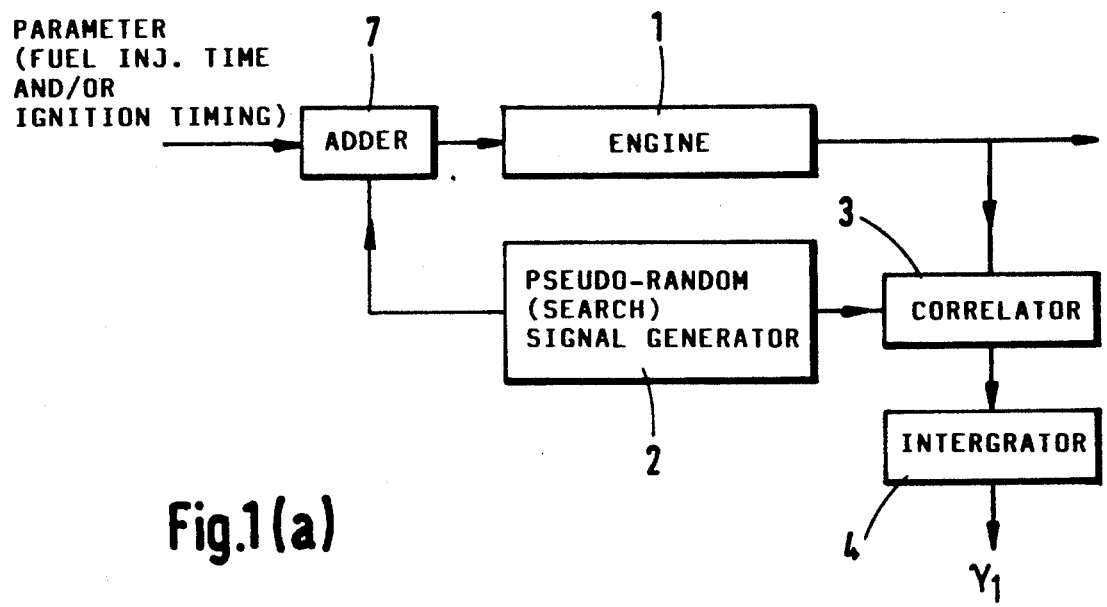
FIG. 1(a) shows a block schematic diagram of a simplified form of an engine control apparatus in accordance with this invention.

An apparatus of the invention in simplified form is shown in FIG. 1a in which an internal combustion engine 1 has a parameter thereof which is to be sensed or corrected. The parameter to be sensed or corrected has a noise signal component thereon which makes detection of a small incremental change of the parameter impossible to detect in the prior art. In the present invention a psuedo random signal is generated which is herein termed a search signal and which may be an M series signal known per se, briefly described later herein but described more fully in "CORRELATION FUNCTION AND SPECTRUM—Measurement and Application thereof", edited by Takashi Isobe, published by Tokyo-Daigaku-Shuppansha.

Figure 1B:
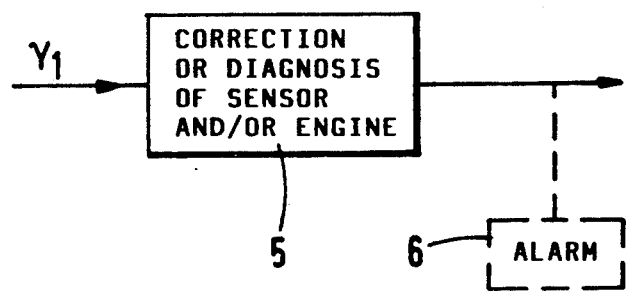
FIG. 1(b) shows in simplified block schematic form apparatus for effecting corrective action.

The search signal is generated by a generator 2 which outputs the search signal to be added by adder 7 into the parameter to be sensed or corrected, e.g. fuel injection time and/or ignition timing. The parameter with the search signal added thereto and, of course including the noise signal component, is applied as one input to a correlator 3, the other input of the correlator 3 being provided from the search signal generator 2. The correlator 3 thus is able to detect the combined engine parameter and the search signal and to correlate the search signal so that, effectively, the noise and the search signal are removed in the correlation process. The output of the correlator is applied to an integrator 4 which acts as a digital filter, the output of the intergrator 4 providing a correction factor $\gamma_1$. The correction factor $\gamma_1$, as shown in FIG. 1(b) is applied to a unit 5 for correcting or diagnosing sensor and/or engine parameters. The output of the unit 5 may also be applied to an alarm 6 shown in broken lines.

Figure 2:
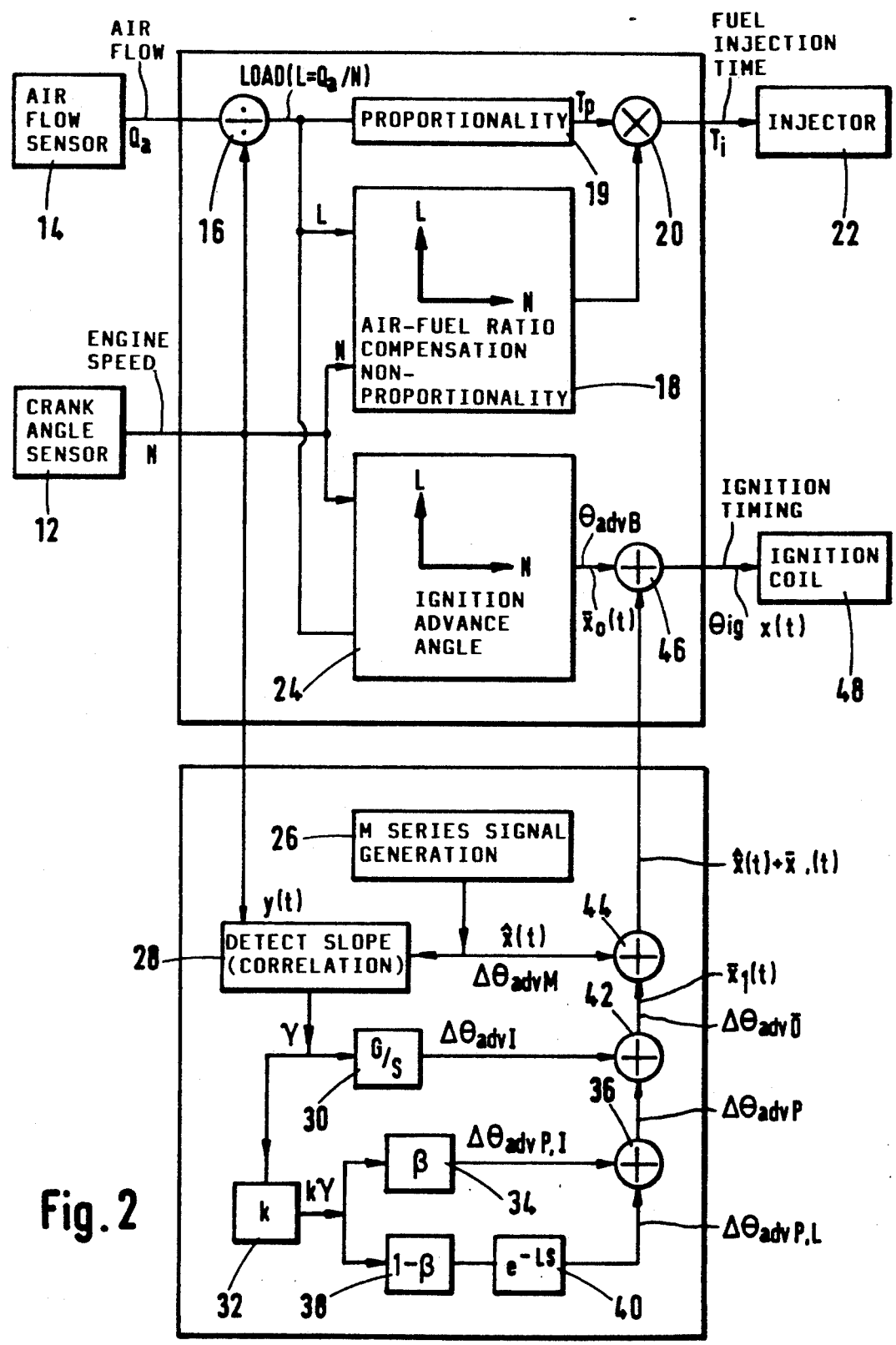
FIG. 2 shows a block schematic diagram of one embodiment of the invention related to controlling ignition timing.

An embodiment of the invention will now be described in more detail with reference to FIG. 2. The speed, i.e. number of revolutions N, of an internal combustion engine is detected by a crank angle sensor 12, and air quantity $Q_a$ sucked into a cylinder of the engine is detected by an air flow sensor 14. The crank angle sensor 12 also supplies reference signals REF shown in FIG. 9(a) and position indicating signals at, for example, 1° intervals as shown in FIG. 9(b). The signals REF are generated for example at 110° before top dead center (TDC) and the REF signals and POS signals are supplied to a control unit (not shown in FIG. 2). A divider 16 calculates the ratio of the air quantity $Q_a$ versus number of revolutions of the internal combustion engine N, and generates a signal corresponding to load L ($L=Q_a/N$). An air fuel ratio compensator 18 receives signals representative of load L and engine revolutions N (and optionally the output of an air fuel ratio sensor $O_2$) and supplies a signal representative thereof to one input of a control unit 20, shown diagrammatically as a multiplier. The other input of the unit 20 is a standard injection timing signal $T_p$ derived by unit 19 that is proportional to load L. The unit 20 provides a fuel injection time signal $T_i$ for a cylinder of the internal combustion engine, the signal being provided to a fuel injector 22. The control unit 20 provides as an output the actual fuel injection time $T_i$ either by adding the injection time calculated by the air/fuel ratio compensator 18 to the standard fuel injection time $T_p$ (as shown in FIG. 2) or by multiplying the standard time $T_p$ by a correction coefficient (not shown). The fuel injector 12 injects the fuel into the cylinder of the engine for the injection period $T_i$.

Figure 3A:
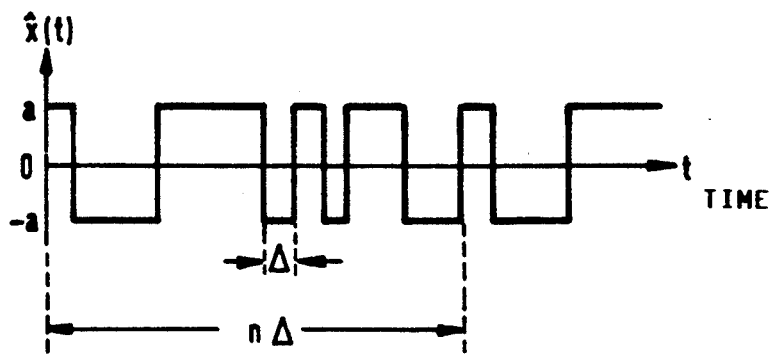
FIG. 3(a) shows an M series signal used in this invention, FIG. 3(b) a self correlation function of the M series signal shown in FIG. 3(a)
Figure 6A:
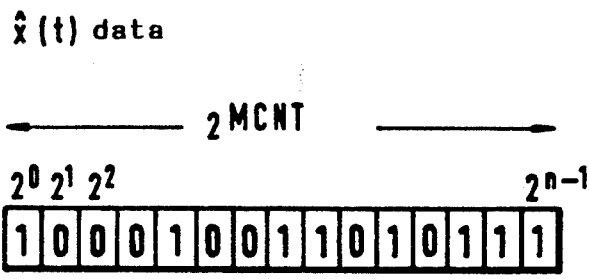
FIG. 6(a) shows a register count for the M series signal.

An ignition timing control unit 24 generates a basic ignition advance angle $\theta_{advB}$ which is determined in response to the number of revolutions of the internal combustion engine and load and read from a map held in ROM in the unit 14. A pseudo random signal having varying mark ($\Delta$)/space ratio which repeats after time period $n\Delta$ where n is an integer is used as a correction signal and the pseudo random signal, search signal is an M series signal generated by a generator 26 located within a single-chip micro computer 50. The M series signal $\hat{x}(t)$ is based on the data shown in FIG. 6(a) and 6(b) described later herein. The M series signal has a signal component of ignition advance angle $\Delta\theta_{advM}$. A parameter y(t) representative of the number of engine revolutions is combined with the M series signal, the resultant is detected and the M series signal correlated by unit 28. The output of the correlator $\gamma$ is applied to an integral control 30 and to a proportional control 32. The output of the proportional control 32, $k\gamma$ is multiplied in unit 34 to provide a signal $\Delta\theta_{advPI}$ which is applied to an adder 36. The signal $k\gamma$ is applied to a unit 38 evaluating $1-\beta$ and thence to unit 40 producing $e^{-LS}$ which is a lag operator where L is lag time and S is Laplace operator $d/dt = \int dt$ to provide an output $\Delta\theta_{adv}$, P, L which is applied as another input to adder 36. The output of adder 36 is signal $\Delta\theta_{advP}$ which is applied to one input of another adder 42 having as another input the output $\Delta\theta_{advI}$ from unit 30. The resultant output from adder 42 is $\Delta\theta_{adv\bar{o}}$ which is the optimised signal component of the ignition advance angle and given by $\hat{x}_1(t)$. The output from adder 42 is applied to another adder 44 which receives as another input the output $\Delta\theta_{advM}$ from the M series signal generator 26. The combined signals are applied to another adder 46 having input $\hat{x}_O(t)$ which is the basic ignition advance angle $\theta_{advB}$ to provide an output x(t) which is the ignition timing signal $\theta ig$ applied to the ignition coil 48. Thus a mutual correlation function is performed of the M series signal $\hat{x}(t)$ and engine RPM N represented by y(t), the correlation function is integrated and the output $\gamma$ is a phase integral which is itself integrated and after combining with the M series signal in adder 44 so the signal is overlapped onto the basic ignition advance angle $\theta_{advB}$ denoted by $\hat{x}_O(t)$ and the ignition timing supplied to the coil 48. The M series signal, as shown in FIG. 3(a) has an amplitude a, a minimum pulse width $\Delta$, period n $\Delta$ where n is the maximum sequence and in the present embodiment equals 31. However n equals 5 and 15 are integers found by trial and experiment for different engine types which may also be used. The M series signal has an impulse type self correlation function as defined by $$\phi_{\hat{x}\hat{x}}(a) = \frac{n+1}{n} a^2$$

As will be described later herein the M series signal $\hat{x}(t)$ is generated with the amplitude a in a range causing a change in the number of engine revolutions that will not be perceived by a driver of the vehicle and the M series signal is overlapped on the ignition timing signal $\theta$ig. The mutual correlation function and the phase shift integral of this M series signal $\hat{x}(t)$ versus the number of revolutions y (t) of the engine are calculated to determine output torque gradient $\gamma$. To set the ignition timing forward or backward from its basic position together with changing the magnitude thereof in response to the positive or negative sign and the magnitude of the output torque gradient $\gamma$, the output torque gradient is integrated and combined on the original engine timing signal. In such a manner the ignition timing is controlled so as to be maintained at the optimum position without the necessity as in the prior art of excessively fluctuating the engine speed of revolution so that jerking of the vehicle is not noted by a driver with use of this invention.

Although discrete units 28–44 have been shown, in the preferred embodiment, the functions performed by these units are effected under software control in the micro computer 50.

The theory behind the present invention will now be described.

The impulse response $g(\alpha)$, when an M series signal $\hat{x}(t)$ is used as the input signal in the method of the present invention is determined by calculating the mutual correlation function $\phi\hat{x}y(\alpha)$ of input $\hat{x}(t)$ and the output y(t) based on the input signal $\hat{x}(t)$. Accordingly if the following relation holds, $$\bar{x}(t)=\bar{x}_d(t)+\bar{x}_1(t)$$

the equations (1) and (2) below hold. Because $\bar{x}(t)$ changes more slowly than $\hat{x}(t)$ it can be regarded as a DC component so that the signal $\hat{x}(t)$ can be regarded as a signal varying about a mean level $\bar{x}(t)$. Similarly for the engine RPM $\bar{y}(t)$ may be considered as the DC component about which the engine RPM $\hat{y}(t)$ fluctuates.

$$x(t)=\hat{x}(t)+\bar{x}(t) \quad (1)$$

$$y(t)=\hat{y}(t)+\bar{y}(t) \quad (2)$$

Figure 3B:
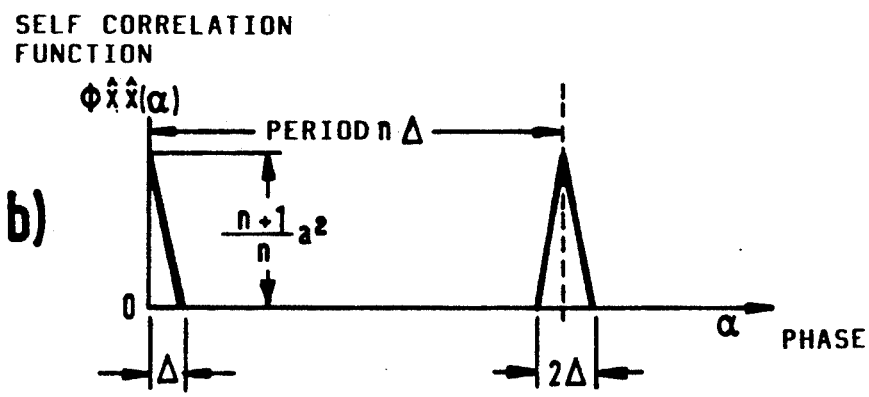
FIG. 3(c) shows a torque against ignition timing characteristic used in the embodiment of the invention.
Figure 3C:
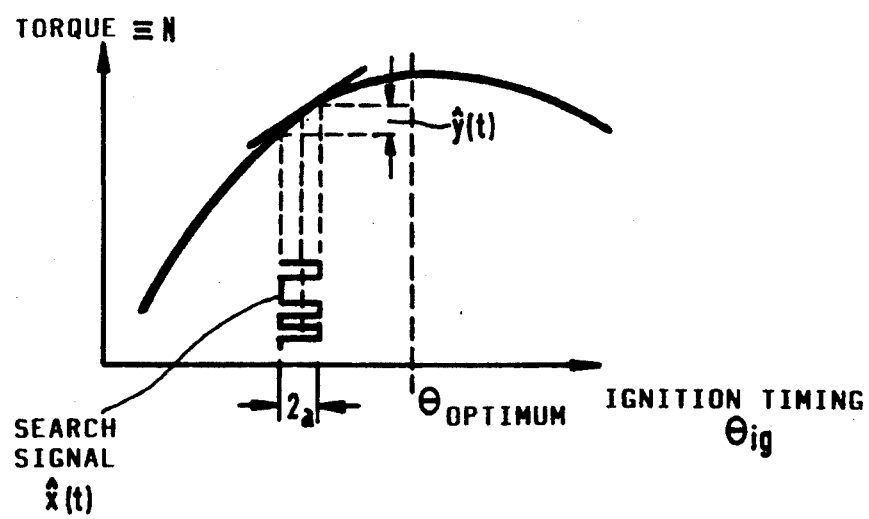

The characteristics shown in FIG. 3(c) of torque (which is equivalent to engine speed of rotation) against ignition timing ($\theta$ig) has a characteristic which is initially positive and then negative. The optimum ignition angle $\theta_{optimum}$ is taken when the slope of the torque/ignition angle curve is zero. The slope of the curve is thus constantly monitored for the optimum angle at which torque is maximum. In this invention the slope of the characteristic is measured over the search signal amplitude and it will be seen from FIG. 3(c) that if the search signal $\hat{x}(t)$ has a sufficiently small amplitude then the torque/ignition angle characteristic is substantially linear. Therefore the relationship between the search signal $\hat{x}(t)$ and the output component $\hat{y}(t)$ which corresponds to the search signal (in other words the relationship between the ignition timing and the number of revolutions of the engine) is represented by the following equations (3) to (5)

$$y(t) = \int_0^{n\Delta} g(\alpha)\{\bar{x}(t) + \hat{x}(t-\alpha)\}d\alpha \quad (3)$$

$$\bar{y}(t) = \int_0^{n\Delta} g(\alpha)\bar{x}(t)d\alpha \quad (4)$$

$$\hat{y}(t) = \int_0^{n\Delta} g(\alpha)\hat{x}(t-\alpha)d\alpha \quad (5)$$

n$\Delta$: One cycle of of M series signal
$\Delta$: Minimum pulse width of M series signal
n: Sequence number of M series signal
$\alpha$: Phase shift between successive n$\Delta$ periods of $\hat{x}(t)$.

Further, the mutual correlation function $\phi\hat{x}\hat{y}(\alpha)$ for the search signal $\hat{x}(t)$ and the output signal $\hat{y}(t)$ is represented by the following equation (6). From control theory output $$(\alpha) = \int_{-\alpha}^{+\alpha}$$

(transfer function) x (inpulse input) d$\alpha$ $$\phi\hat{x}\hat{y}(\alpha) = \int_0^{n\Delta} g(t)\phi\hat{x}\hat{x}(t-\alpha)dt \quad (6)$$

Here, $\phi\hat{x}\hat{x}(\alpha)$ is a self correlation function for M-series signals, and is given by the following formula;

$$\phi\hat{x}\hat{x}(\alpha) = \frac{1}{n\Delta}\int_0^{n\Delta} \hat{x}(t)\hat{x}(t-\alpha)dt \quad (7)$$

Because the search signal $\hat{x}(t)$, is an M series signal which includes all frequency components, its power spectrum density function $\phi\hat{x}\hat{x}(\alpha)$ is constant, accordingly.

$$\phi\hat{x}\hat{x}(\alpha)=\phi\hat{x}\hat{x}(0)$$

As a result, the self correlation function, $\phi\hat{x}\hat{x}(t-\alpha)$, which appears in equation (6), is represented by equation (8) using delta function $\delta$;

$$\phi\hat{x}\hat{x}(t-\alpha)=\phi\hat{x}\hat{x}(0)\cdot\delta(t-\alpha) \quad (8)$$

Hence, the mutual correlation function $\phi\hat{x}\hat{y}(\alpha)$ shown in equation (6) is transformed as follows;

$$\begin{aligned}\phi\hat{x}\hat{y}(\alpha) &= \int_0^{n\Delta} g(t)\cdot\phi\hat{x}\hat{x}(o)\cdot\delta(t-\alpha)dt \\ &= \phi\hat{x}\hat{x}(o)\int_0^{n\Delta} g(t)\cdot\delta(t-\alpha)dt \\ &= \phi\hat{x}\hat{x}(o)\lim_{\epsilon\to o}\int_{\alpha-\epsilon}^{\alpha+\epsilon} g(t)\cdot\delta(t-\alpha)dt \\ &= \phi\hat{x}\hat{x}(o)\cdot g(\alpha)\end{aligned} \quad (9)$$

As is evident from the above, the impulse response $g(\alpha)$ is given by equation (10) below using the mutual correlation function $\phi\hat{x}\hat{y}(\alpha)$ between $\hat{x}(t)$ and $\hat{y}(t)$.

$$g(\alpha)=\phi\hat{x}\hat{y}(\alpha)/\phi\hat{x}\hat{x}(0) \quad (10)$$

where, $\phi\hat{x}\hat{x}(O)$ corresponds to the integrated value of self correlation function $\phi\hat{x}\hat{x}$, and is given by the following equation;

$$\phi\hat{x}\hat{x}(0) = (n+1)\Delta a^2/n = Z(\text{constant}) \tag{11}$$

where a: amplitude of the M series signal

The mutual correlation function $\phi\hat{x}\hat{y}(\alpha)$ is transformed as shown below using equation (2);

$$\begin{aligned} \phi\hat{x}\hat{y}(\alpha) &= \int_0^{n\Delta} \hat{y}(t) \cdot \hat{x}(t-\alpha)dt \\ &= \int_0^{n\Delta} \{y(t) - \overline{y}(t)\} \cdot \hat{x}(t-\alpha)dt \\ &= \int_0^{n\Delta} \{y(t) \cdot \hat{x}(t-\alpha)dt - \int_0^{n\Delta} \overline{y}(t) \cdot \hat{x}(t-\alpha)dt \\ &= \phi\hat{x}y(\alpha) - \phi\hat{x}\overline{y}(\alpha) \end{aligned} \tag{12}$$

Thus, $$g(\alpha) = \{\phi\hat{x}y(\alpha) - \phi\hat{x}\overline{y}(\alpha)\}/Z \tag{13}$$

where the second term of equation (13) $\phi\hat{x}\overline{y}(\alpha)$ is the mutual correlation function between the M-series signal $\hat{x}(t)$ and the DC component of output $\overline{y}(t)$. The first term $\phi\hat{x}y(\alpha)$ is a mutual correlation function between the M-series signal input $\hat{x}(t)$ and output $y(t)$.

$y(t)$ is composed of fluctuating components due to the influence of M-series signal $x(t)$, and the DC component from $\hat{x}(t)$; however, it is difficult to separate and detect these components so that a directly obtainable function is a mutual correlation function $\phi\hat{x}y$ shown by the following equation.

$$\phi\hat{x}y = \frac{1}{n\Delta} \int_0^{n\Delta} y(t) \cdot \hat{x}(t-\alpha)dt \tag{13'}$$

However, the value of $\phi\hat{x}\overline{y}(\alpha)$ approximates to the value of $\phi\hat{x}y(\alpha)$ if the value of $\alpha$ is large because the value of $\phi\hat{x}y(\alpha)$ is no longer influenced by $\hat{x}(t)$. Therefore, $\phi\hat{x}\overline{y}(\alpha)$ can be approximately substituted by the average value of $\phi\hat{x}y(\alpha)$ in the interval between $\alpha 1$ and $\alpha 2$.

$$g(\alpha) \approx \left\{ \phi\hat{x}y(\alpha) - \frac{1}{\alpha_2 - \alpha_1} \int_{\alpha_1}^{\alpha_2} \phi\hat{x}y(\alpha)d\alpha \right\}/Z \tag{14}$$

where, $\alpha 1$ and $\alpha 2$ are bias compensation terms and they are selected to have values close to n. $\Delta$.

Further, output torque slope with respect to ignition angle $\gamma$, i.e. change of torque with respect to change of ignition angle $\theta$ig, in the interval between $\alpha_S - \alpha_L$ is given by equation (15), $$\gamma = \int_{\alpha_S}^{\alpha_L} g(\alpha)d\alpha \tag{15}$$

is the starting time of the integration in consideration of the leading edge of the impulse response due to the pseudo-white noise of the M-series signal. $\alpha_L$ is the ending time of the integration inverval for impulse response integration. This is set in advance, in accordance with the impulse response characteristics. This output torque slope $\gamma$ corresponds to the change in number of revolutions of the internal combustion engine, when the ignition timing is changed by a unit quantity by the search signal, and this is called the output torque gradient.

In the embodiment of the present invention shown in FIG. 2, the optimum ignition timing is more smoothly achieved by overlapping the further integration of the above-mentioned output torque gradient $\gamma$ on the ignition timing signal $\theta$ig.

The invention will now be described by way of example in conjunction with various flow diagrams where the operation of micro computer 50 is described.

Figure 4:
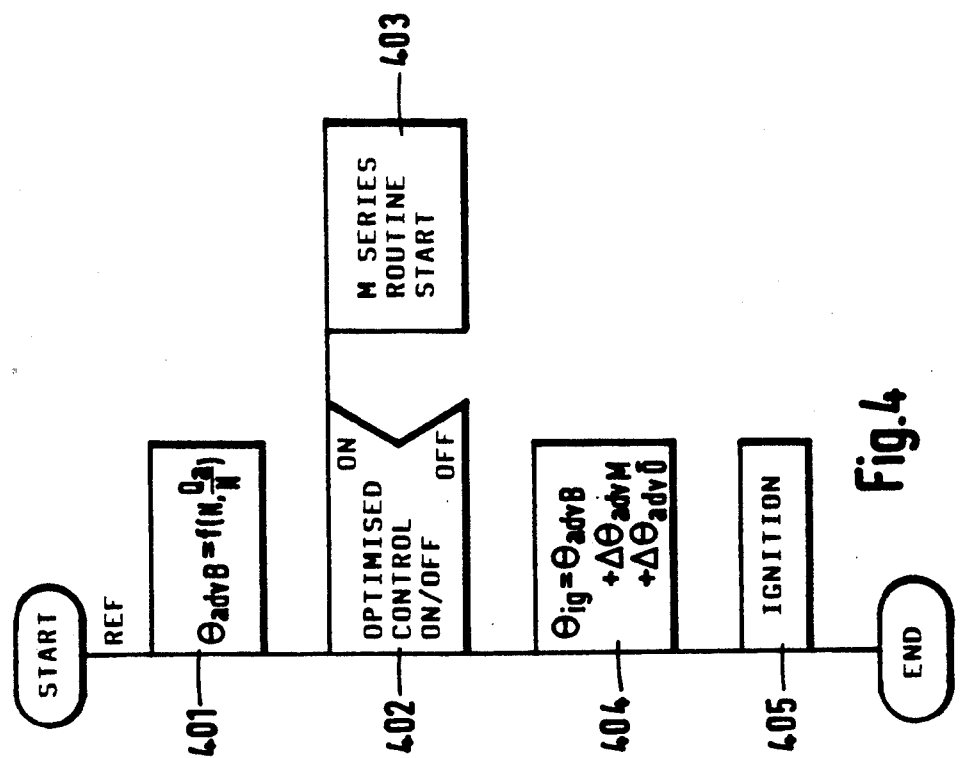

Referring to FIG. 4 the timing is started with a reference signal REF and a basic ignition advance angle $\theta_{advB}$ which is a function of engine revolutions N and load $(Q_a/N)$ is determined in step 401. In an optimised control routine 402 under the flag ON condition an M series ignition advance angle setting routine 403 is set to start, the M series routine being described more fully with reference to FIG. 5. In an ignition advance angle routine 404 the ignition advance $\theta$ig is determined using equation (16)

$$\theta_{ig} = \theta_{advB} + \Delta\theta_{advM} + \Delta\theta_{advO} \tag{16}$$

where, $\theta$ig: ignition advance angle, $\theta_{advB}$: basic ignition advance angle, $\theta\Delta_{advM}$: M series signal component of the ignition advance angle, $\theta\Delta_{advO}$: optimised signal component of the ignition advance angle.

It will be understood that the processing step 404 is shown schematically in FIG. 2 as the summation of inputs of adders 44 and 46.

Figure 6B:
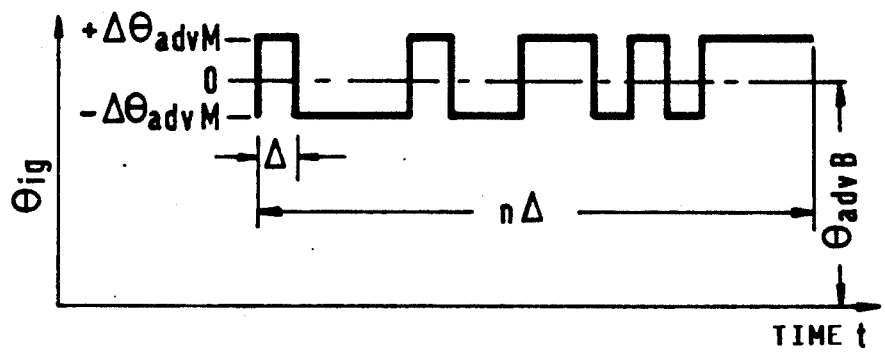
FIG. 6(b) shows in further detail the M series signal.

In an ignition energising start timing routine 405, the power is supplied to the ignition coil 48. The M series signal is shown in FIG. 6(b) having a abscissa of time against ignition angle $\theta$ig and the mean amplitude of the M series signal is at $\theta_{advB}$ with the amplitude of the M series signal being represented by $\Delta\theta_{advM}$.

Figure 5:
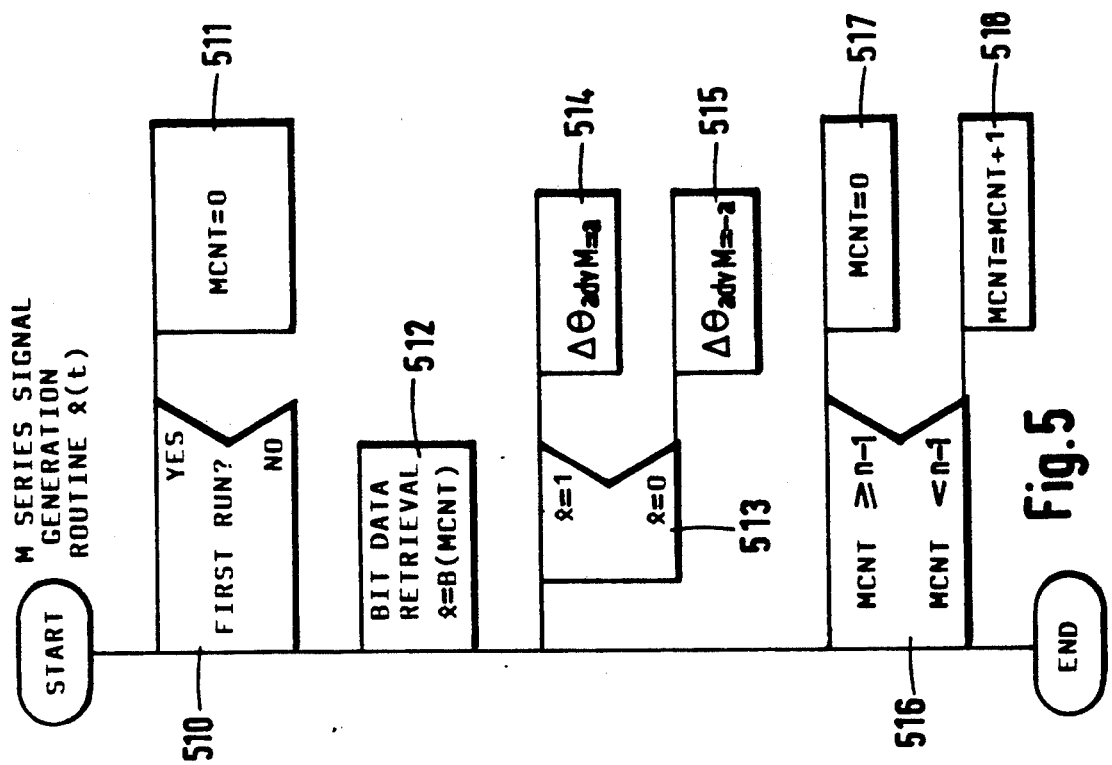
FIG. 4 and FIG. 5 show flow diagrams used in performing the invention.

Referring now to FIG. 5, the M series signal component ignition advance angle routine is shown in detail. In this routine the M series signals are generated by successive readout of bit data from previously set M series signal $\hat{x}$ (t) data. The data is read out of a register, schematically shown in FIG. 6(a) having register positions $2^0$ to $2^{n-1}$ and having a total count herein shown as $2^{MCNT}$. The first run of data is determined in step 510 and if affirmative a counter MCNT is cleared at step 511. Retrievals for the M series signal bit data are then performed at step 512, then, using equation:

$$\begin{aligned} \text{for } \hat{x}(t) &= 1, \Delta\theta_{advM} = a \\ \text{for } \hat{x}(t) &= 0, \Delta\theta_{advM} = -a \end{aligned} \tag{17}$$

where a is the amplitude of the M series signal.

The M series signal component ignition advance angle $\Delta\theta_{advM}$ is thus generated at steps 513, 514 and 515.

Next, at steps 516, 517 and 518, the counter/register MCNT is updated in accordance with following:

$$\begin{aligned} &\text{in case } MCNT \geq M, MCNT = 0, \\ &\text{in case } MCNT < M, MCNT = MCNT + 1, \end{aligned} \tag{18}$$

where, n−1: period of M-series signal.

Figure 7:
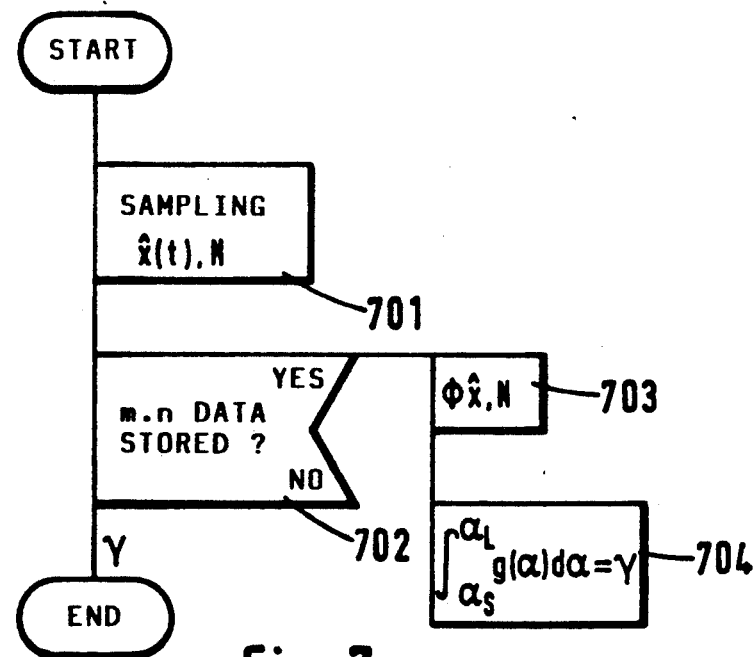
FIGS. 7 and 8 show further flow diagrams used in the operation of the invention.

FIG. 7 is a flow diagram of the slope of the torque/ignition timing slope detection and correlation performed by unit 28. The M series signal $\hat{x}(t)$ is sampled together with the number of revolutions of the internal combustion engine N at step 701 and both sets of data are input and memorised in the micro computer. When data input corresponding to one cycle of M series signal is completed, that is to say when m. n samples are taken, where m is the number of samples in period $\Delta$ and n is the number of stages in the register shown in FIG. 6(a) (typically m=5 and n=31) then the self correlation function of equation 13' is performed at step 703, it being remembered that N is equivalent to y(t). The output torque gradient $\gamma$ is computed at step 704 in accordance with equations 14 and 15.

In the above calculations m is an interger as will be described later herein.

At the step 702 it is determined whether the data m and n is stored in memory and if it is then the calculation for $\gamma$ can be performed.

Figure 8:
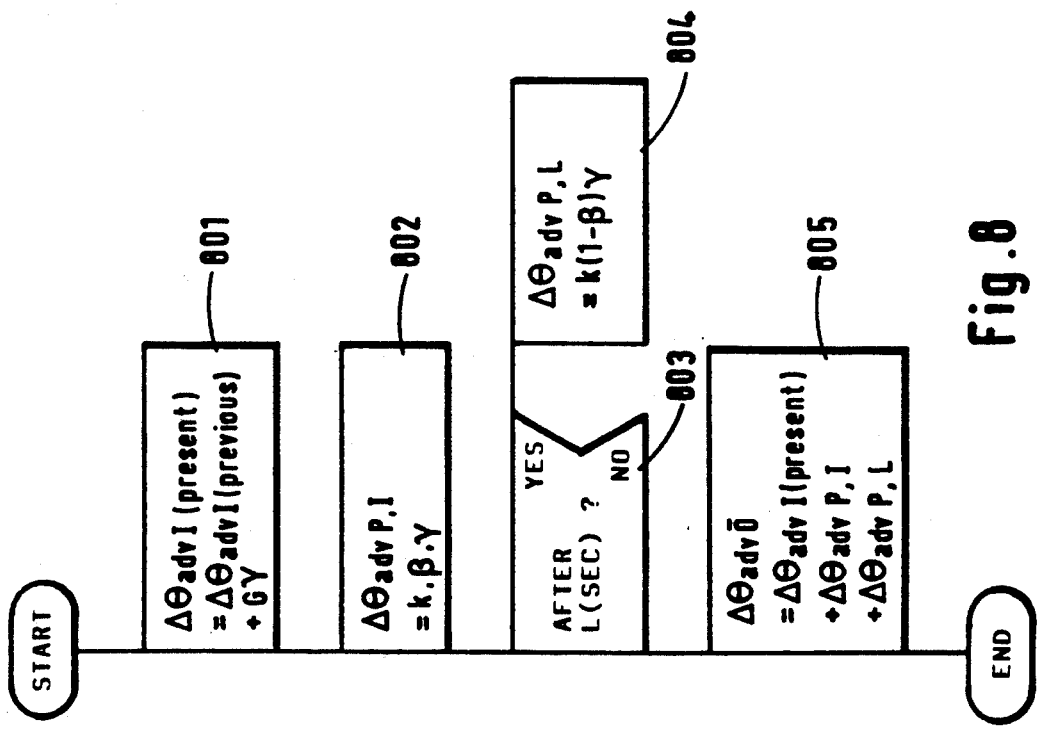

In the flow diagram of FIG. 8 an optimised signal component of the ignition advance angle $\Delta \theta_{adv\bar{O}}$ is determined. At step 801 $\Delta \theta_{advI \, present}$ is calculated from $$\Delta \theta_{advI \, present} = \Delta \theta_{advI \, previous} + G \cdot \gamma \quad (19a)$$

where $\Delta \theta_{advI \, present}$ is the integral of the present value $\Delta \theta_{adv}$, $\Delta \theta_{advI \, previous}$ is the integral of the previous value of $\Delta \theta_{adv}$, G is the integration coefficient. The equation (19a) evaluated at step 801 is the output of unit 30 shown in FIG. 2.

At step 802 the following equation is calculated $$\Delta_{advPI} = k \cdot \beta \cdot \gamma \quad (19b)$$

where k is a proportional coefficient and $\beta$ is an immediate factor of proportional output which in the present embodiment = 0.3.

The terms used in this calculation are shown in FIG. 14(a) and the calculation at step 802 is the output of unit 34 shown in FIG. 2.

The integration control gain coefficient G is a coefficient representing the relationship between an output torque gradient and an optmised ignition timing and is set in accordance with individual internal combustion engines.

Figure 14:
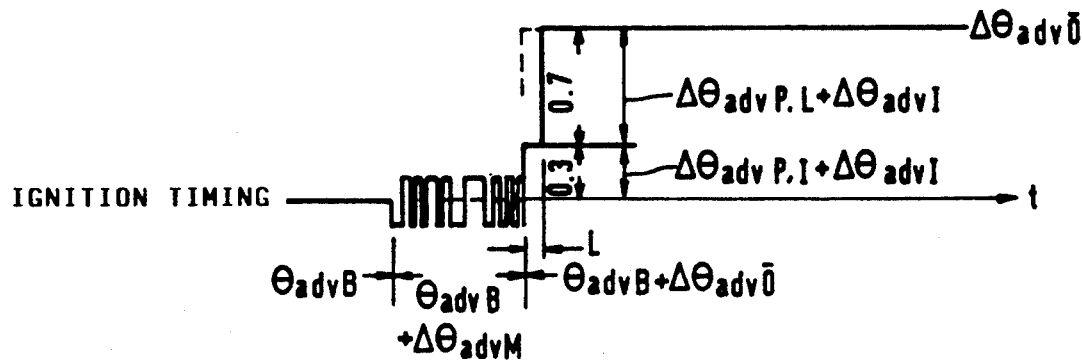
FIG. 14 shows further aspects of the M series signal overlapping onto an ignition timing signal.

As shown in FIG. 14 the optimised signal component ignition advance angle $\Delta \theta_{adv\bar{O}}$ is preferably formed in two steps in conformity with the immediate factor of proportional output $\beta$ and in accordance with a phase delay time L.

Thus at step 803 it is determined whether time delay L has occurred and if it has then the program steps to step 804 and $\Delta \theta_{advPL} = k(1-\beta)\gamma$ is calculated.

The output of step 804 is the output of the units 38 and 40 schematically shown in FIG. 2 and the equation $$\Delta \theta_{adv\bar{O}} = \Delta \theta_{advI} + \Delta \theta_{advP} \quad (19c)$$

where $\Delta \theta_{advP} = \Delta \theta_{advPI} + \Delta \theta_{advPL}$ is calculated at step 805 and this is the optimised signal component of the ignition signal which is the output of adder 44 shown in FIG. 2.

By arranging that the optimised signal component of the ignition advance angle $\Delta \theta_{adv\bar{O}}$ is given in two steps as shown in FIG. 14, a sudden change in ignition timing is suppressed.

FIG. 9 shows the relative timings on which the respective calculation routines operate.

As previously described, FIG. 9(a) shows the ignition timing setting routine to start with the timing of reference signals REF which are generated for each cylinder. The reference signals are generated at 110° before top dead centre (TDC) of each cylinder. For a six cylinder engine, reference signals REF are generated every 120°, that is, three pulses are generated per revolution, i.e. two revolutions are performed in one cycle so that six reference signals REF are generated during one cycle. Reference signals $R_1$ to $R_3$ correspond to the first cylinder to the third cylinder only and the period $T_{ref}$ of the reference signal REF becomes smaller as the number of engine revolutions increases.

The position signals are shown in FIG. 9(b) and are generated at 1° intervals at rotation of the crank shaft.

The ignition coil current is controlled in response to the calculated results of this routine, and an ignition pulse is generated at the previously determined ignition timing. The flow time for the ignition coil current is determined upon conditions such as output voltage of the battery and number of revolutions of the internal combustion engine, and the starting time for the current $T_S$ is adjusted to a value computed by the ignition advance angle setting routine, as shown in FIG. 9(d) and 9(e). For example, if an M series signal such as the one shown in FIG. 9(c) is produced, and the ignition advance angle is changed with $\pm a$ then the starting time for the current $T_S$ is modified with $\pm a$ resulting in an adjustment $T_f$ of the ignition coil current and the ignition pulse shown in FIG. 9(f) is generated at time $T_f$.

Independently from the ignition timing setting routine which is set to start synchronously with reference signal REF, an optimised control routine starts at an optimised control timing which is determined by dividing the reference signal REF into 1/m, where m is predetermined integer. FIGS. 9(g) and 9(h) show an embodiment where m=5. As the timing period $T_{ref}/m$ at which the optimised control routine is set to start is proportional to the reference signal REF, the number of revolutions of the internal combustion engine is detected by measuring the interval of the optmised control timing operation. Since the detected number of revolutions has the same value within the period from one optimised control timing pulse generation to the next timing pulse generation (such as an interval T shown in FIG. 9(g)), the optimised control routine is set to start at anywhere within the interval T. Any number from 1 to 5 can be selected as the value for integer m, however, even if a larger number of m is selected, the detected number of revolutions is virtually the same at low speed running and such a larger number will only result in increasing a burden on the micro-computer. In practice, values such as 1 or 2 are adequate.

Figure 15:
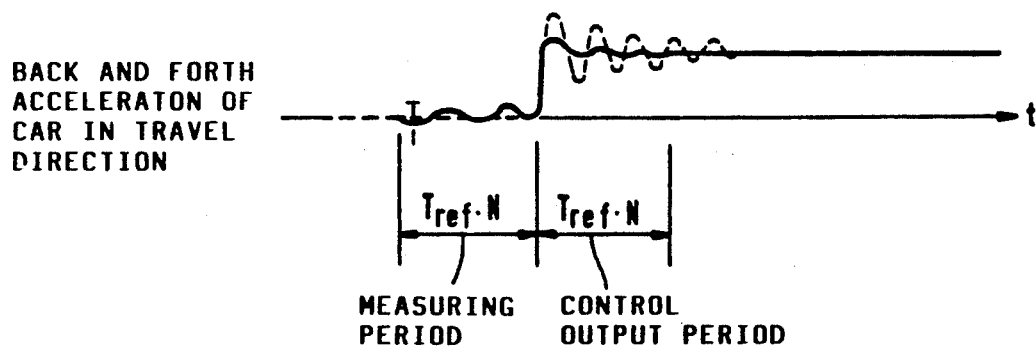
FIG. 15 shows the results of overlapping the M series signal on the acceleration of the vehicle.

If the ignition advance angle setting routine and the optimised control routine are independently controlled as described above, both routines are not always sychronised and, moreover, priority may be given with regard to either of the processings. As a result, the optimised control routine may be run on a time basis; further if there is insufficient processing time, the processing of the ignition advance angle setting routine may be given priority so that the control can be made certain. Additionally, as shown in FIG. 15, the processing may be separately executed during the measuring period for obtaining an output torque gradient in every period of the M series signal $T_{ref} \cdot N$ and during the control output period so as to control the ignition timing at an optimised value.

The minimum pulse widths $\Delta$ of the M series signal is an integer as large as the number of combustion strokes of the internal combustion engine. In the case of a six cylinder engine, for example, a reference signal REF is generated at every 120°, that is to say, six signals for every 2 revolutions, and the minimum pulse width $\Delta$ is set at an integer as large as the period $T_{ref}$ of the reference signal REF. For example, with an M series signal, if the minimum pulse width $\Delta$ is set at the same magnitude as the number of combustion strokes, then the result is as shown in FIG. 10(a), and if the minimum pulse width is set to be six times as large as the number of combustion strokes then the result is as shown in FIG. 10(b). If the minimum pulse width is set at the number of combustion strokes, all the cylinders are given the same ignition timing signal. If the minimum pulse width $\Delta$ is set as a magnitude less than the number of combustion strokes it may happen that two or more ignition timing commands are given simultaneously to one cylinder or the M series signal falls into disorder. This minimum pulse width is set at a small magnitude with an increasing number of engine revolutions.

Another embodiment of the present invention will now be described, which embodiment facilitates a decreased memory capacity with respect to the embodiment shown in FIG. 2.

In the calculations for the indicial (step) response $\gamma$, the equation is transformed into the form of equation (20) below by exchanging the time integral in the mutual correlation function with the integral of the above phase $\alpha$:

$$\gamma \approx \int_{\alpha S}^{\alpha L} \left( \phi\hat{x}y(\alpha) - \frac{1}{\alpha_2 - \alpha_1} \int_{\alpha_1}^{\alpha_2} \phi\hat{x}y(\alpha)d\alpha \right) d\alpha/Z \quad (20)$$

$$= \frac{1}{n\Delta \cdot Z} \int_{\alpha S}^{\alpha L} \left\{ \int_0^{n\Delta} \hat{x}(t-\alpha) \cdot y(t)dt - \right.$$

$$\left. \frac{1}{\alpha_2 - \alpha_1} \int_{\alpha_1}^{\alpha_2} \int_0^{n\Delta} \hat{x}(t-\alpha) \cdot y(y)dt \right\} d\alpha$$

$$= \frac{1}{n\Delta \cdot Z} \int_0^{n\Delta} \left\{ \int_{\alpha S}^{\alpha L} \hat{x}(t-\alpha)d\alpha - \right.$$

$$\left. \frac{1}{\alpha_2 - \alpha_1} \int_{\alpha S}^{\alpha L} \int_{\alpha_1}^{\alpha_2} \hat{x}(t-\alpha) \cdot d\alpha \right\} y(t)dt$$

$$= \frac{1}{n\Delta \cdot Z} \int_0^{n\Delta} \left\{ \int_{\alpha S}^{\alpha L} \hat{x}(t-\alpha)d\alpha - \right.$$

$$\left. \frac{1}{\alpha_2 - \alpha_1} \int_{\alpha S}^{\alpha L2} \hat{x}(t-\alpha) \cdot d\alpha \right\} y(t)dt$$

$$\gamma = \int_0^{n\Delta} x(t) \cdot y(t) \cdot dt/(n\Delta \cdot Z)$$

where Z: power of auto correlation of M series signal, i.e. area of triangle having base $2\Delta$ of FIG. 3(b), and X(t) is a function corresponding to the intergration by parts of the signal $\hat{x}(t)$ represented by equation (21) below, and depends on $\hat{x}(t)$ only, with no relation to the response signal y(t) of an internal combustion engine control system.

$$x(t) = \int_{\alpha S}^{\alpha L} \hat{x}(t-\alpha)d\alpha - \frac{\alpha L - \alpha S}{\alpha_1 - \alpha_2} \int_{\alpha_1}^{\alpha_2} \hat{x}(t-\alpha) \cdot d\alpha \quad (21)$$

From equation (12):

$$\gamma \approx \left\{ \int_0^{n\Delta} x(t) \cdot \hat{y}(t)dt + \int_0^{n\Delta} x(t) \cdot \hat{y}(t)dt \right\}/n\Delta \cdot Z \quad (22)$$

Reforming the above, the indicial response $\gamma$ is represented by:

$$\gamma = k_1 \int_0^{n\Delta} x(t) \cdot y(t)dt \quad (23)$$

$$\chi(t) = \int_{\alpha S}^{\alpha L} \hat{x}(t-\alpha)d\alpha - K_2 \int_{\alpha_1}^{\alpha_2} \hat{x}(t-\alpha)d\alpha \quad (24)$$

$$k_1 = \frac{2}{(N+1) \cdot \Delta \cdot a} \quad (25)$$

$$k_2 = \frac{\alpha L - \alpha S}{\alpha_2 - \alpha_1} \quad (26)$$

X(t), which is given by equation (24), is the function which corresponds to the partially integrated value of the search signal $\hat{x}(t)$, and which is called the correlation signal. Not all the data of this correlation signal X(t) needs to be stored in a memory, provided the initial value X(0) is first determined and the difference is calculated at each timing. Now, when a sampling period is denoted by $T_S$, the following equations are used for the determination.

$$x(o) = \sum_{i=0}^{P} x(\Delta - iTs) \cdot Ts - K_2 \sum_{i=0}^{P} \hat{x}(\alpha_1 - jTs) \cdot Ts \quad (27)$$

$$x(t) - x(t - Ts) = Ts \left[\hat{x}(Ts + \Delta) - \bar{x}(t + \Delta - (p+1)Ts) - \right. \quad (28)$$
$$\left. K_2\{x(t - \alpha_1) - x(t - \alpha_1 - (q+1)Ts)\} \right]$$

$$\text{provided} = \frac{\alpha L - \alpha \bar{S}}{Ts}, q = \frac{\alpha_2 - \alpha_1}{Ts} \quad (29)$$

If the time integral in equation (28) is approximated by a moving average, i.e. a time shifted repetitive calculation of integration of a portion of X(t), the necessary memory capacity for the integral calculation will be greatly reduced.

Figure 11:
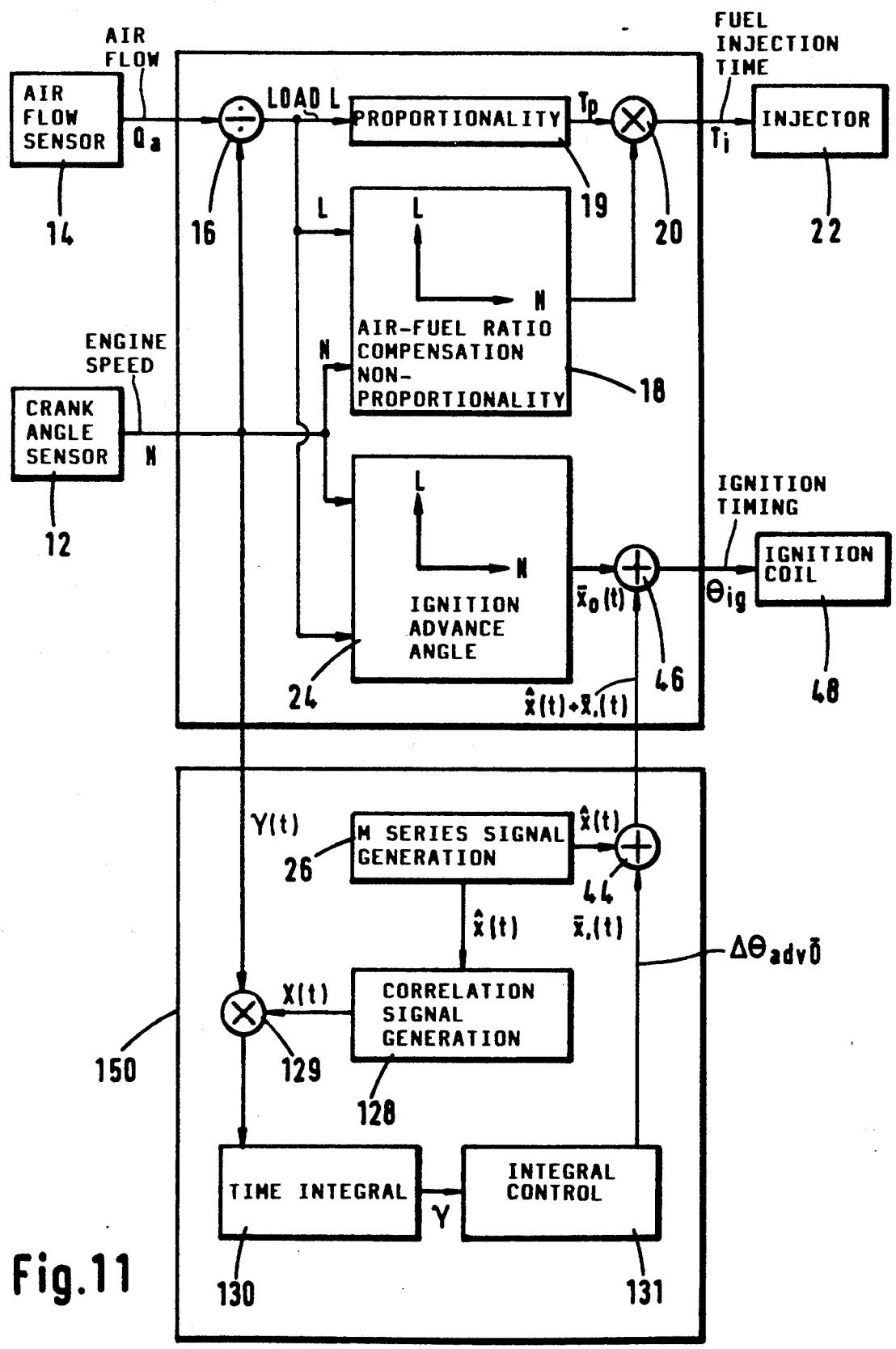
FIG. 11 shows a further embodiment in accordance with this invention used to control ignition timing of an internal combustion engine.

Referring to FIG. 11, the micro processor 150 in this embodiment has an M series signal generator 26 supplying signal $\hat{x}(t)$ to an adder 44 added and to a correlation signal generator 128. The output from the correlation signal generator is signal X(t) which is supplied as one input to a multiplier 129, the other input of the multiplying being signal y(t) representative of the engine rotational speed. Output from multiplier 129 is fed to a time integrater 130 the output of which is signal $\gamma$ supplied to an integral control unit 131. Output from unit 131 is signal $\Delta\theta_{adv\bar{o}}$ which is supplied to another input to the adder 44. The remaining part of the circuit shown in FIG. 11 is similar to that shown in FIG. 2.

Figure 12:
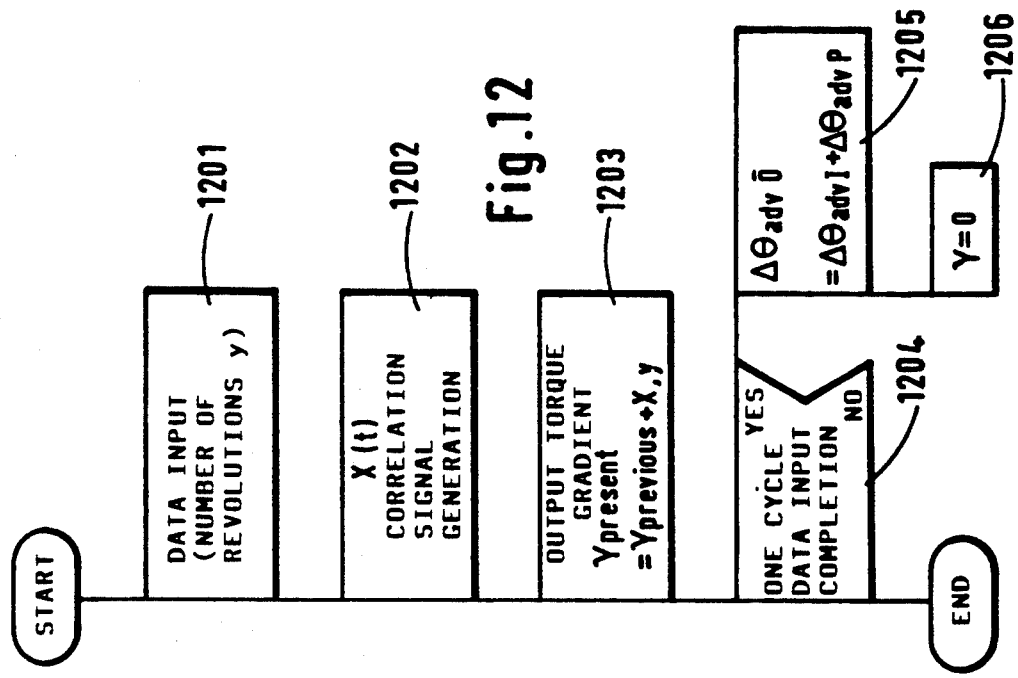
FIG. 12 shows a flow diagram of the operation of the embodiment shown in FIG. 11, FIGS. 13(a)-13(e) show graphical wave forms of the results of a simulation using the invention.

The correlation function X(t) is calculated in accordance with equation (28) sychronously with the M series signal and is stored in a memory. The optimised control program for execution by a micro computer is shown in the flow diagram of FIG. 12.

In a data input 1201 the number of revolutions of the internal combustion engine y is sampled and the correlation signal is generated at step 1202 to provide X(t) as shown in equation (21). At step 1203 the following equation is calculated $$\gamma_{present} = \gamma_{previous} + Xy \qquad (30)$$

When the above processing is executed for one cycle period of M series signals determined by step 1204, the optimimum signal component ignition advance angle $\Delta\theta_{adv\bar{0}}$ is determined using equation (19) (c) at step 1205. The output torque gradient $\gamma$ is reset at step 1206 to prepare for the next cycle calculation. In this embodiment the correlation function is calculated in a step-by-step method. Therefore there is no need to store the M series data signals x(t) and the number of revolutions of the internal combustion engine y over one cycle of the M series signal, thus the memory capacity required is greatly reduced. Because, the integral by phase $\alpha$ is executed in advance, real time execution is limited to the time integral only and the time required for calculations is therefore greatly reduced.

FIG. 13 shows the results of some simulations of the present invention when applied to a six cylinder internal combustion engine.

FIG. 13(a) shows M series signal changes of plus or minus 1° which are overlapped onto an ignition timing signal and the number of engine revolutions changed with the M series signal by approximately 50 RPM as shown by FIG. 13(b). A mutual correlation function between the detected number of revolutions of the engine was calculated for each period of the M series signal to provide an output torque gradient as shown in FIG. 13(c) and as a result of the overlap of the integrated value of the output torque gradient on the ignition timing signal, so the ignition timing moved from its initial position of 20° before TDC to a new position of 28° before TDC (the optimum position) in about 4 seconds as shown by FIG. 13(d). At this movement, the acceleration of the vehicle in the direction of travel was within ±0.03 G, which is in a range that would not be perceived by a driver as shown in FIG. 13(e).

Referring again to FIG. 15, the solid line shows the crank shaft rotation where two steps are taken to reach $\Delta\theta_{adv\bar{0}}$ whereas if a single step is taken then the larger change in engine rotation causes the crank oscillate as shown by the broken line in FIG. 15.

In FIG. 14 there is shown an example when the M series signal is successively overlapped on the ignition timing signal. If the M series signal is given a change of ±2° as shown in FIG. 16(a) then the number of revolutions of the crank shaft changes by approximately ±30 RPM as shown in FIG. 16(b). When the M series signal was overlapped for approximately 600 msec, the torque gradient $\gamma$ changed by about 6.5 RPM/° as shown in FIG. 16(c). Considering such a change in relation to the embodiment of FIG. 2, the torque gradient is determined in such a way that the mutual correlation function between the M series signal $\hat{x}(t)$ and the output y(t) is calculated using equation (13'), then using this correlation function, the torque gradient was determined with equations (14) and (15).

FIG. 17 shows the test results using an actual car, where the M series signal overlapped for 620 msec, as shown in FIG. 17(a). As a result, the ignition timing was corrected by about 10° from 23° to 30° as shown in FIG. 17(a) and 17(b) and the delay time L was 140 msec. As a result, the revolution speed exhibited a hill climbing characteristic as shown in FIG. 17(c) and the ignition timing moved to the optimum position.

Having described the invention, it will be understood that the invention renders ignition timing control of an internal combustion engine smoother, providing very small velocity changes for change in ignition timing.

Although the subject invention has been described in relation to modifying the ignition timing, the invention is not intended to be so restricted. In this respect the M series signal could be used to incrementally modify fuel injection pulse width or could be used to detect an output from an $O_2$ sensor to control fuel injection to thereby provide a cleaner exhaust gas.

We claim:

1. An engine control apparatus including means defining an engine variable signal having a noise frequency component therein, generating means for generating an M series signal having a binary amplitude value and an impulse-type self correlation function, means for applying said M series signal to said engine variable signal, means for detecting the combined M series signal and engine variable signal having said noise frequency component therein, means for correlating the M series signal with said combined signal to filter out the M series signal and the noise frequency component to leave an engine output characteristic signal, means for integrating said engine output characteristic signal, and means for applying the result of said integration to control said defining means.

2. An apparatus as claimed in claim 1 wherein said means defining an engine variable is a sensor for detecting the number of revolution of an internal combustion engine.

3. An apparatus as claimed in claim 2 wherein a basic ignition advance angle is derived from memory means comprising a map of engine load against engine revolutions and adder means are provided for combining said basic ignition advance angle with the output of said means for integrating whereby the ignition timing angle is adjusted to an optimum value.

4. An apparatus as claimed in claim 1 wherein there is provided an air quantity sensor for measuring air quantity $Q_a$ supplied to the internal combustion engine, an injector for supplying fuel to said engine, micro computer means for controlling said injector and an ignition coil, said micro computer being arranged to generate a fuel injection period signal $T_i$ in dependence upon a load on the engine ($L = Q_a/N$) determined by the ratio of outputs of the air quantity sensor and the engine revolution sensor.

5. An apparatus as claimed in claim 1 wherein said control function means is a means to control at least one of ignition timing and fuel injection pulse width.

6. An apparatus as claimed in claim 1 wherein said control function means is a warning lamp indicative of an incorrect engine operating parameter.

7. A method of controlling an internal combustion engine including the steps of defining an engine variable signal having a noise frequency component therein, generating an M series signal having a binary amplitude value and an impulse-type self correlation function, applying said M series signal to said engine variable signal, detecting the combined M series signal and said engine variable signal having said noise frequency component therein, correlating the M series signal with said combined signal to filter out the M series signal and the noise frequency component to leave an engine output characteristic signal, integrating the engine output characteristic signal and applying the result of said integration to control said engine.

8. A method as claimed in claim 7 wherein the control function is an ignition timing control for an internal combustion engine and the result of said integration is combined with a basic engine ignition advance angle to provide an optimum ignition timing signal.

9. A method as claimed in claim 7 wherein said search signal is overlapped onto an ignition timing signal, a correlation signal is read out which is a function obtained by integration by parts of said search signal stored in a memory in synchronism with said search signal, an output torque gradient relative to ignition timing caused by the search signal from said mutual correlation signal is determined and the number of revolutions of the internal combustion engine is detected by a revolution sensor, a correction signal is obtained by integration of said output torque gradient and said ignition timing is corrected by the correction signal to produce an up/down manipulation of said ignition timing signal to thereby vary the number of revolutions of the engine.

10. A method as claimed in claim 7 wherein said search signal is an M series signal.

11. A method as claimed in claim 7 wherein said search signal has a minimum pulse width defined by the number of combustion strokes of the internal combustion engine.

12. A method as claimed in claim 7 wherein said search signal has a predetermined period which is arranged to become shorter with increasing number of revolutions of the engine.

13. A method as claimed in claim 7 wherein the number of engine revolutions N are detected, an air quantity $Q_a$ to be supplied to the engine is detected, a micro computer generates a fuel injection period signal $T_i$ in dependence upon the load on the engine ($L=Q_a/N$) determined by the ratio of air quantity to engine revolutions and said micro computer also generates a basic ignition timing signal in dependence upon load on the engine and number of engine revolutions ($\theta_{advB}$) the basic ignition timing signal being combined with the result of integration for application to an ignition coil.

14. An ignition timing control method for an internal combustion engine having a micro computer for performing computations in response to number of revolutions and load on the internal combustion engine, and for producing ignition timing adjustments, the ignition timing control method changing the number of revolutions of the engine a small amount through up/down manipulation of said ignition timing by overlapping a search signal having a binary amplitude value and an impulse-type self correlation function on said ignition timing signal, computing a mutual correlation function of the number of revolutions of the internal combustion engine and of said search signal, and applying said computed mutual correlation function to correct said ignition timing.

15. A method as claimed in claim 14 wherein the impulse response is determined using the mutual correlation function, and indicial response is determined by integration of the impulse response and a signal integrating the indicial response is used as said correcting signal.

16. A method as claimed in claim 12 wherein said search signal has a minimum pulse width which decreases with increasing number of engine revolutions.

17. In an ignition timing control method for an internal combustion engine having a micro computer which performs computations in response to the number of revolutions and the load on the internal combustion engine and makes ignition timing adjustments with an ignition timing signal generated on the basis of said computed results, said ignition timing control method including the steps of changing a number of revolutions of the internal combustion engine through up/down manipulation of said ignition timing by overlapping a search signal on said ignition timing signal, said search signal having
   a) binary values,
   b) a minimum pulse width defined by the number of commbustion strokes of said engine, and
   c) an impulse-type self correlation function, determining an output torque gradient at a unit change of the ignition timing, integrating said output torque gradient to provide a correction signal and applying said correction signal to adjust said ignition timing.

18. A method of correcting an internal combustion engine parameter which is susceptible to electrical noise including the steps of combining said parameter with a search signal having a binary amplitude value and an impulse-type self correlation function, digitally filtering the combined signal to provide a correcting signal and controlling said engine with said correcting signal.

19. A method as claimed in claim 18 wherein said parameter is an output of an $O_2$ sensor and said modifying condition is one of varying ignition timing or fuel injection pulse width.

20. An ignition timing control method for an internal combustion engine having a micro computer performing computations in response to number of revolutions and load on the internal combustion engine and adjusting the ignition timing of said engine with an ignition timing signal generated on the basis of the computed results, said method including the steps of:
   (a) generating a search signal having a binary amplitude value and an impulse-type self correlation function,
   (b) overlapping said search signal on said ignition timing signal to change the number of revolutions of the engine by a small amount through up/down manipulation of said ignition timing,
   (c) reading out a correlation signal which is a function obtained by integration by parts of said search signal stored in a memory of said micro computer in synchronism with said search signal,
   (d) determining an output torque gradient at a unit change of the ignition timing caused by the search signal from said mutual correlation signal and the number of revolutions of the engine,
   (e) integrating said output torque gradient to provide a correction signal, and
   (f) applying said correction signal to adjust said ignition timing.

* * * * *